United States Patent
Roberge et al.

(10) Patent No.: US 9,528,658 B2
(45) Date of Patent: Dec. 27, 2016

(54) TAP FOR A STORAGE CONTAINER, CONTAINER PROVIDED WITH SUCH A TAP, AND CORRESPONDING USE

(71) Applicant: L'AIR LIQUIDE, SOCIÉTÉ ANONYME POUR L'ETUDE ET L'EXPLOITATION DES PROCÉDÉS GEORGES CLAUDE, Paris (FR)

(72) Inventors: Guillaume Roberge, Maubec (FR); Laurent Allidieres, Saint Martin d'Uriage (FR); Zsolt Zsigmond, Margency (FR)

(73) Assignee: L'Air Liquide, Société Anonyme pour L'Etude et l'Exploitation des Procédés Georges Claude, Paris (FR)

( * ) Notice: Subject to any disclaimer, the term of this patent is extended or adjusted under 35 U.S.C. 154(b) by 175 days.

(21) Appl. No.: 14/384,498

(22) PCT Filed: Feb. 11, 2013

(86) PCT No.: PCT/FR2013/050277
§ 371 (c)(1),
(2) Date: Sep. 11, 2014

(87) PCT Pub. No.: WO2013/135983
PCT Pub. Date: Sep. 19, 2013

(65) Prior Publication Data
US 2015/0040985 A1    Feb. 12, 2015

(30) Foreign Application Priority Data

Mar. 14, 2012 (FR) .................................... 12 52282

(51) Int. Cl.
*F17C 13/04* (2006.01)

(52) U.S. Cl.
CPC ......... *F17C 13/04* (2013.01); *F17C 2201/056* (2013.01); *F17C 2201/058* (2013.01);
(Continued)

(58) Field of Classification Search
CPC ................... Y10T 137/877; Y10T 137/87981; Y10T 137/87096; F17C 13/04; F17C 2205/0332; F17C 2205/0329; F17C 2205/036; F17C 2205/0326
See application file for complete search history.

(56) References Cited

U.S. PATENT DOCUMENTS 5,188,017 A    2/1993 Grant et al.
5,309,945 A *  5/1994 Sakai ..................... F17C 13/04
141/18

(Continued)

FOREIGN PATENT DOCUMENTS

EP          0747796        12/1996
WO    WO 2005093377        10/2005
WO    WO 2007048954         5/2007

OTHER PUBLICATIONS

PCT/FR2013/050277, International Search Report and Written Opinion, Apr. 22, 2013 (12 pp).

*Primary Examiner* — Eric Keasel
(74) *Attorney, Agent, or Firm* — Elwood L. Haynes (57) ABSTRACT

The invention relates to a tap including a body, which is provided with a gas inlet that is to be connected to the storage space of a container, a bleed-off circuit, including a downstream end, characterized in that the tap further includes a circuit for selectively controlling the movement of the isolation valve into the first position for opening the bleed-off circuit, the control circuit including a first end connected to the valve, and a second end that can be selectively coupled to an actuator of a gas bleed-off member, in order to selectively electrically control the movement of the valve into the position for opening the bleed-off circuit.

5 Claims, 5 Drawing Sheets

(52) U.S. Cl.
CPC .. *F17C 2205/013* (2013.01); *F17C 2205/035* (2013.01); *F17C 2205/0326* (2013.01); *F17C 2205/0329* (2013.01); *F17C 2205/0332* (2013.01); *F17C 2205/0338* (2013.01); *F17C 2205/0341* (2013.01); *F17C 2205/0385* (2013.01); *F17C 2205/0394* (2013.01); *F17C 2221/012* (2013.01); *F17C 2223/0123* (2013.01); *F17C 2223/036* (2013.01); *F17C 2227/048* (2013.01); *F17C 2250/032* (2013.01); *F17C 2250/034* (2013.01); *F17C 2250/036* (2013.01); *F17C 2250/043* (2013.01); *F17C 2250/0439* (2013.01); *F17C 2250/0491* (2013.01); *F17C 2250/0626* (2013.01); *Y02E 60/321* (2013.01); *Y10T 137/877* (2015.04)

(56) References Cited

U.S. PATENT DOCUMENTS

| | | | | |
|---|---|---|---|---|
| 5,813,429 A * | 9/1998 | Ohtaka | ...................... | F17C 5/06 137/266 |
| 5,975,121 A | 11/1999 | Arzenton et al. | | |
| 6,314,986 B1 * | 11/2001 | Zheng | ...................... | F17C 5/02 134/166 C |
| 6,766,829 B2 * | 7/2004 | Takeda | .................... | F16K 1/305 137/613 |
| 6,782,918 B2 * | 8/2004 | Rousselin | ............... | F16K 1/305 137/613 |
| 7,309,113 B2 * | 12/2007 | Carter | ................... | F16K 31/406 137/505 |
| 7,546,744 B2 * | 6/2009 | Harper | ...................... | F17C 1/12 141/4 |
| 8,322,357 B2 * | 12/2012 | Chen | ....................... | F17C 13/04 137/14 |
| 8,381,763 B2 * | 2/2013 | Moretti | .................... | F17C 13/04 137/505.11 |
| 8,671,997 B2 * | 3/2014 | Allidieres | ................. | F17C 5/06 141/104 |
| 8,978,715 B2 * | 3/2015 | Allidieres | ................. | F17C 5/06 141/1 |
| 2003/0066836 A1 | 4/2003 | Sakaguchi et al. | | |
| 2003/0164195 A1 | 9/2003 | Girouard et al. | | |
| 2004/0261866 A1 | 12/2004 | Suzuki et al. | | |
| 2005/0103382 A1 | 5/2005 | Carter | | |
| 2009/0223976 A1 | 9/2009 | Denis et al. | | |
| 2010/0186837 A1 * | 7/2010 | Bleys | ...................... | F16K 1/305 137/614.11 |

\* cited by examiner

TAP FOR A STORAGE CONTAINER, CONTAINER PROVIDED WITH SUCH A TAP, AND CORRESPONDING USE

CROSS REFERENCE TO RELATED APPLICATIONS

This application is a 371 of International PCT Application FR2013/050277 filed Feb. 11, 2013 which claims priority to French Patent Application No. 1252282 filed Mar. 14, 2012, the entire contents of which are incorporated herein by reference.

BACKGROUND

The present invention relates to a tap for a storage container, a container provided with such a tap and a corresponding use.

SUMMARY

More specifically, the invention relates to a tap, in particular for a pressurized gas storage container, comprising a body fitted with a gas inlet intended to be connected to the storage space of a container, a bleed-off circuit formed in the body and comprising an upstream end intended to be connected fluidly to the storage space of a container and a downstream end intended to be connected fluidly and selectively with a gas bleed-off member, a filling circuit formed in the body and comprising a first end intended to be connected selectively to a filling member of the container and a second end intended to be connected to the storage space of the container, the bleed-off circuit comprising an isolation valve and a pressure-release member for the gas bled off at a given fixed or adjustable pressure, the tap also including a member for manually controlling the movement of the isolation valve, the control member being selectively movable to a first position and to a second position, in which in the first position thereof the control member moves the isolation valve to an open position of the bleed-off circuit, and in the second position thereof the control member moves the isolation valve to a closed position of the bleed-off circuit.

The invention notably relates to a bleed-off and/or filling tap for a pressurized fluid storage container, as well as an assembly including such a tap and a bleed-off member.

Pressurized gas tanks, in particular tanks of hydrogen gas stored at pressures of between 200 and 1000 bar, require taps that enable gas bleed-off operations to be controlled reliably.

Documents WO2007048954A1 and EP0747796 describe examples of taps for pressurized gas tanks.

The present invention is intended to propose a gas tap having functionalities enabling it to be adapted to different uses.

For this purpose, the tap according to the invention, in addition to matching the generic definition given in the preamble above, is essentially characterized in that the tap also includes, in the body, a circuit for controlling the selective movement of the isolation valve to the first position thereof opening the bleed-off circuit, the control circuit having a first end linked to the valve and a second end selectively connectable to an actuator of a gas bleed-off member, to electrically and selectively control the movement of the valve to the position thereof opening the bleed-off circuit.

In this manner, management of the bleed-off can be controlled manually and/or automatically (electrically). The tap can therefore adopt three perfectly secure and distinct operating modes.

These control modes for the isolation valve are perfectly differentiated and safe with regard to the outside and in particular users of the tap.

Furthermore, the embodiments of the invention may have one or more of the following features:

The isolation valve and the pressure-release member for the gas bled off are distinct elements arranged in series in the bleed-off circuit, The isolation valve also forms a selective pressure-release member for the gas bled off, the isolation valve being a valve controlled selectively and proportionally by a separate actuator to selectively adjust the output pressure of the gas bled off, The isolation valve also forms a selective pressure-release member for the gas bled off, the isolation valve being a valve controlled selectively and proportionally by a separate actuator to selectively adjust the output pressure of the gas bled off, The control circuit includes a passage formed in the body of the tap that leads to the outside of the body at an inlet orifice, the inlet orifice being designed to receive, in the body, a movable pushrod belonging to a preferably electrical actuator of a gas bleed-off member, so as to selectively move the valve to the open position thereof, The passage of the control circuit located between the inlet orifice and the isolation valve has at least one movable force-transmission part to transmit a force from a pushrod penetrating the inlet orifice towards the isolation valve, such that the movement of the isolation valve to the open position thereof is effected indirectly via the at least one transmission part actuated by a pushrod, When the control member is in the first position thereof, the isolation valve is mechanically blocked in the position thereof opening the bleed-off circuit, regardless of the state of the control circuit and the state of any electrical actuator connected to the control circuit, When the control member is in the second position thereof, the isolation valve is mechanically blocked in the position thereof closing the bleed-off circuit, regardless of the state of the control circuit and the state of any electrical actuator connected to the control circuit, The control member can be moved to a third neutral position in which the isolation valve can be moved between the positions thereof opening and closing the bleed-off circuit as a function of the state of the control circuit and any electrical actuator connected to the control circuit, The tap includes a return member that by default forces the isolation valve towards the position thereof closing the bleed-off circuit, The isolation valve is placed upstream of the release member on the bleed-off circuit, The body contains, in the control circuit, a selectively movable stop placed between the isolation valve and the inlet orifice, When the control member is in the first position thereof, this member places a movable stop in a fixed and stable position mechanically blocking the isolation valve in open position and ensuring there is no connection between, on one hand, an electrical actuator of a bleed-off member and, on the other, the isolation valve, When the control member is in the second position thereof, it places a movable stop in a fixed and stable position forming a screen preventing the transmission of force between, on one hand, an electrical actuator of a bleed-off member and, on the other, the isolation valve, such as to ensure that the isolation valve is only subject to the force of the return member thereof forcing it towards the closed position thereof, When the control member is in the third position thereof, this control member places a movable stop in a position that can be modified, in particular by means of a pushrod controlled by the electrical actuator, When the control member is in the third position thereof and the isolation valve is placed in the open position thereof by the electrical actuator, a subsequent movement of the control member to the second position thereof mechanically forces the isolation valve to switch to the closed position thereof by applying to said isolation valve a force greater than that exerted by the actuator, When the control member is in the third position thereof and the electrical actuator is deactivated, i.e. the electrical actuator is not controlling the movement of the isolation valve to the open position thereof, the isolation valve is in the closed position thereof, from this position, the movement of the control member to the first position thereof mechanically forces the isolation valve to switch to the open position thereof, The body contains, in the control circuit, a movable shaft located between the inlet orifice and the movable stop, a first end of the movable shaft being designed to be pushed by a pushrod controlled by the electrical actuator, a second end of the movable shaft being designed to push the movable stop by reaction, The third neutral position of the control member is located between the first and second positions, The pressurized gas storage container includes a pressurized gas bottle or a frame of several pressurized bottles, in which the tap can be shared by several bottles, The tap includes a pressure gauge mounted on the body that measures the pressure in the bleed-off circuit, preferably upstream of the isolation valve, The pressure gauge is electronic and includes electronic logic controlling at least one of the following: a remote data transmission member, a remote data receiving member, a memory, a display, an alarm, The first end of the bleed-off circuit includes a connection provided with a valve that can be moved to an open position in order to fill the container or perform a bleed-off without passing via the pressure-release member, The gas bleed-off member and the downstream end of the bleed-off circuit of the tap are fitted with quick-connect mating fluid connections, The pressure-release member comprises an expansion valve to expand the gas to a given pressure between 4 and 15 bar, for example, The body is provided with one assembly end such as a threaded cylindrical or conical portion designed to be placed level with the orifice of a pressurized gas storage container, The isolation valve can be actuated towards the open position thereof directly by a pushrod of a gas bleed-off member, The assembly includes a sensor, notably an inductive sensor, located on the tap and/or on the bleed-off member to detect the engaged or disengaged position of the tap with the bleed-off member, If the return member of the isolation valve breaks or ruptures, the valve is forced towards the closed position thereof, The assembly may be used in a manual mode when the bleed-off member only includes one mating quick connection for the mechanical fasteners of the tap, The valve and the filling connection of the end of the filling circuit are opened via an external mating connection to enable high-pressure gas to be bled off, Some or all of the valves may be controlled to enable controlled (electrical) adjustment of the pressure bled off, The isolation valve is proportionally controlled by the actuator (electromagnet) to adjust the output pressure of the gas bled off in place of the release member. This helps to improve the precision of the output pressure of the gas via an electrical adjustment loop and also makes it possible to change the setpoint pressure of the gas bled off depending on the requirements of different applications, The valve maintaining a residual pressure in the bottle is designed to remain open continuously until the adjustment pressure thereof is reached, so as not to cause an unwanted pressure drop when the container is fully emptied.

The isolation valve is preferably not opened suddenly, but progressively to prevent a sudden pressure increase downstream of this isolation valve.

For example, the isolation valve is opened by means of a sequence of successive openings/closings. The successive openings preferably increase in length.

For example, the valve is opened as a function of a square signal (possibly sinusoidal).

For example, the valve is opened then closed then opened then closed, etc. with an opening time of between 5 ms and 100 ms, these opening times preferably increasing.

This makes it possible to establish the high pressure progressively downstream of the valve, in particular when the pressure upstream of the valve is very high (between 500 and 1000 bar, for example).

The invention also relates to a pressurized gas storage container including an orifice connected to a tap having any one of the features set out above or below.

The invention also relates to an assembly including a tap having any one of the features set out above or below and a gas bleed-off member that includes an internal gas circuit, the bleed-off member being selectively and mechanically connectable to the tap to form a fluid link between the internal gas circuit and the downstream end of the bleed-off circuit of the tap, the tap and the bleed-off member having removable mating mechanical fasteners to enable them to be separably engaged, the bleed-off member including an actuator to selectively control the movement of the isolation valve to the position thereof opening the bleed-off circuit, the actuator being linked, in the engaged position of the tap of the bleed-off member, to the second end of the control circuit to selectively control the movement of the isolation valve to the open position thereof as a function of the powered state of the actuator.

According to other possible features:

The bleed-off member includes a pushrod controlled by the actuator, in the engaged position of the tap and of the bleed-off member, the pushrod selectively penetrating the control circuit via the second end as a function of the electrically powered state of the actuator, to move the isolation valve to the open position thereof, The electrical actuator includes at least one of the following: an electromagnet, an induction coil, The invention also relates to a use of such an assembly in which the tap has an inlet linked fluidly to the storage space of one or more pressurized gas containers, in which the gas is bled off from at least one container via:

A mechanical engagement step of the bleed-off member on the tap via the mating mechanical fasteners, A step in which the manual control member is moved to a third neutral position in which the isolation valve can be moved between the positions thereof opening and closing the bleed-off circuit depending on the state of the control circuit and any electrical actuator connected to the control circuit, A step in which said actuator is powered electrically to move the isolation valve to the position thereof opening the bleed-off circuit.

The invention may also relate to any alternative device or method including any combination of the features set out above or below.

BRIEF DESCRIPTION OF THE DRAWINGS

Other features and benefits are set out in the description below, provided with reference to the figures in which.

DESCRIPTION OF PREFERRED EMBODIMENTS

Figure 1:
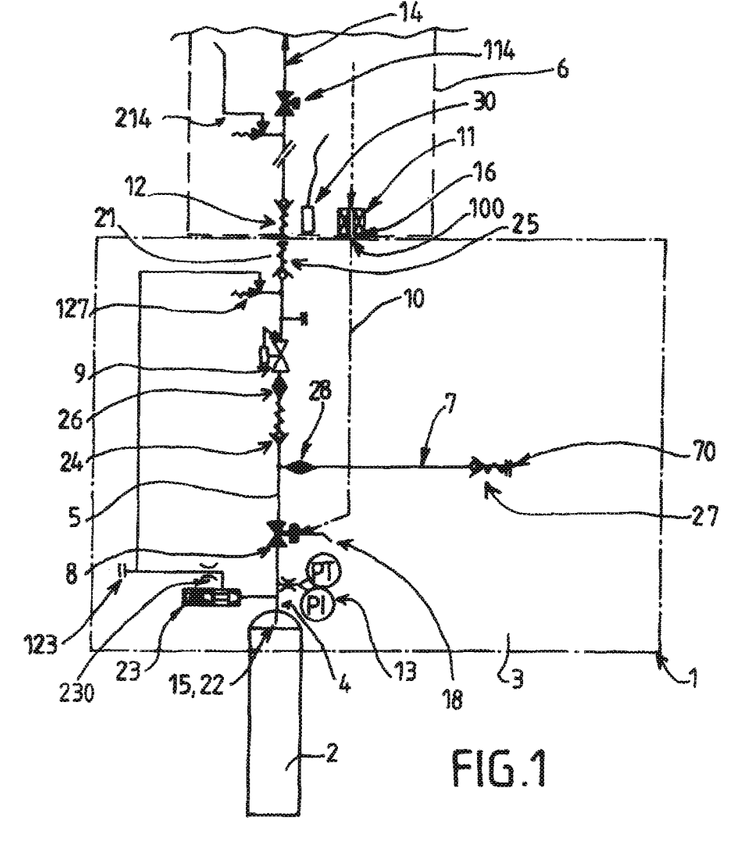
FIG. 1 is a partial schematic view of the internal structure of a tap mounted on a gas bottle and connected to a bleed-off member according to one example embodiment of the invention.

FIG. 1 shows an example embodiment of a tap 1 according to the invention and more specifically to a tap 1 with built-in expansion valve. This tap 1 is designed notably to be used with hydrogen gas, for example at a pressure of 700 bar. Naturally, the invention could be applied to a tap with no built-in expansion valve (i.e. a simple tap or a tap with a removable expansion valve).

Figure 7:
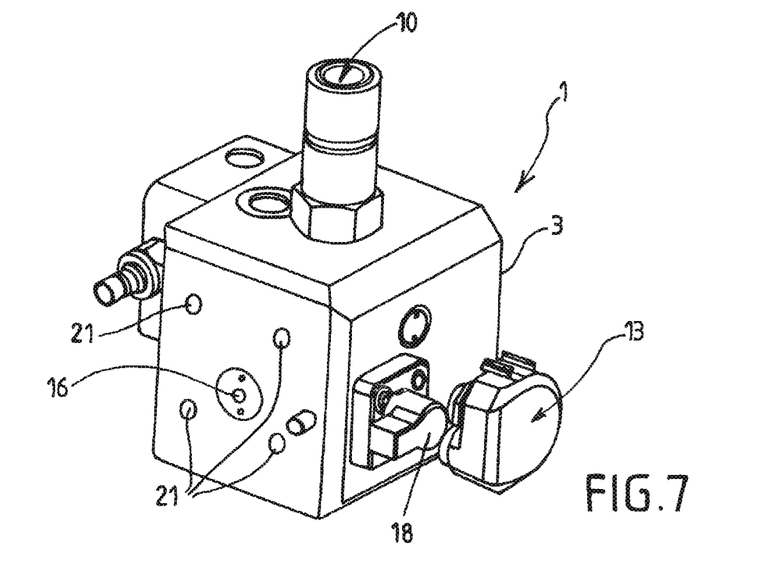
FIGS. 7 and 8 are perspective views from two different orientations of a possible example embodiment of a tap according to the invention.
Figure 9:
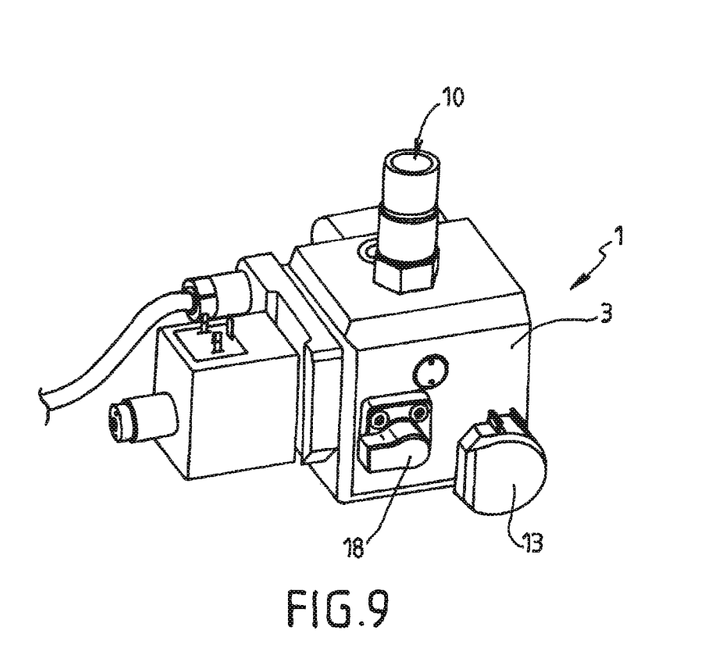
FIG. 9 is a perspective view of the tap in FIGS. 7 and 8 connected to a gas bleed-off member.

The tap 1 includes a body 3 fitted with a gas inlet 22. This inlet 22 is connected to the orifice of a storage space of a container 2. For example, the gas inlet 22 is formed at the end of a threaded cylindrical or conical portion that is attached in the threaded neck of a container 2. Naturally, this example is not limiting and, as shown in FIGS. 7 and 9, the inlet 22 may be designed to receive a pipe linking the tap 1 to a frame of several bottles arranged in parallel (i.e. the tap is not necessarily mounted in the orifice of a container).

The tap 1 includes a bleed-off circuit 5 formed in the body 3. The bleed-off circuit 5 includes one upstream end 15 linked fluidly to the storage space of the container 2 and one downstream end 25 designed to be linked fluidly and selectively to a gas bleed-off member 6 (described below).

For example, the upstream end 15 of the bleed-off circuit 5 coincides with the inlet 22.

The bleed-off circuit 5 includes, arranged in series, an isolation valve 8 and a gas pressure-release valve designed to lower the high pressure of the tank 2 to a given fixed or adjustable low pressure, for example of between 1 and 20 bar.

Preferably (and as shown), the isolation valve 8 is placed upstream of the expansion valve 9 (i.e. before the expansion valve 9 in the direction of a gas flow leaving the tank 2).

Figure 8:
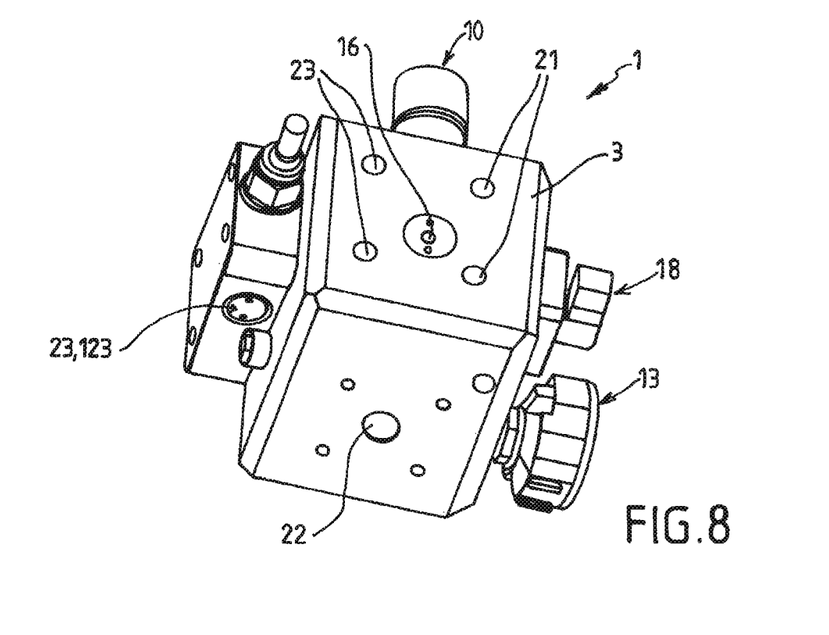

The tap 1 also includes, mounted on the body 3, a member 18 for manually controlling the movement of the isolation valve 8. The control member 18 can be moved manually and selectively to a first position and to a second position. In the first position thereof, the control member 18 mechanically forces the isolation valve 8 into a position opening the bleed-off circuit 5, in the second position thereof, the control member 18 mechanically forces the isolation valve 8 into a position closing the bleed-off circuit 5. As shown in FIGS. 7 to 9, the control member 18 for example rotates in relation to the body 3 and forms for example a pivoting button or lever that cooperates mechanically with the isolation valve 8.

Figure 2:
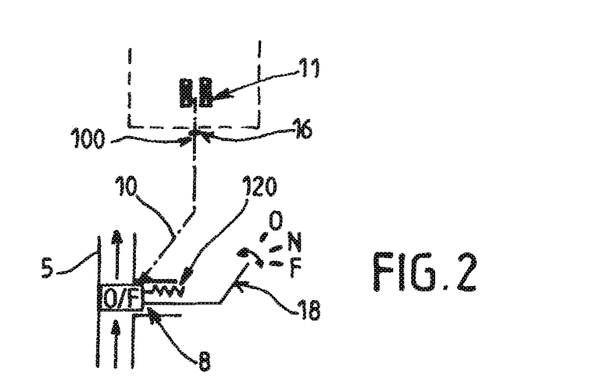
FIG. 2 is a partial schematic cross section showing the structure and operation of a detail of the activation of an isolation valve of the tap in FIG. 1 according to a possible embodiment.

The tap 1 preferably includes a return member 120 such as a spring that by default forces the isolation valve 8 towards the position thereof closing the bleed-off circuit 5 (see FIG. 2).

As also shown, the tap 1 preferably also includes a safety valve 23 ("TPRD") placed upstream of the isolation valve 8 to evacuate the contents of the tank 2 to the outside 123 in the event of danger (excessive temperature and/or pressure).

Preferably, and as shown in FIG. 1, a calibrated orifice 230 is formed downstream of the safety valve 23. Preferably, the gas does not pass through the thermal fuse 23, but this latter selectively blocks the gas output to the calibrated orifice 230. This architecture makes it possible to change the passing diameter of the calibrated orifice without affecting the seal of the thermal fuse 23. Altering the orifice 230 in this way can be useful depending on the size of the container 2 for example, notably to reduce the length of the gas jet (inflamed or otherwise) which is released if the thermal fuse 23 is activated.

For 20-liter containers 2 at a pressure of 700 bar, the size of the orifice 230 is for example between 0.05 m and 0.5 mm to limit a gas jet to 4.3 m. Conversely, for a 140-liter container, the size of the orifice 230 would be around 1 mm, and the length of the jet would be around 8.6 m.

As shown, the tap 1 may include a pressure gauge 13 measuring the pressure PT upstream of the isolation valve 8, and which preferably includes a display PI. Preferably, the pressure gauge 13 is electronic and includes electronic logic controlling at least one of the following: a remote data transmission member, a remote data receiving member, a memory, a display, an alarm. For example, the pressure gauge is of the type described in document WO2005093377A1.

As shown in FIG. 1, the tap 1 may include on the bleed-off circuit 5, between the isolation valve 8 and the expansion valve 9, a residual pressure valve 24 and/or a filter 26.

Downstream of the expansion valve 9, the bleed-off circuit 5 may include a safety valve 127 enabling a flow to be discharged to the outside, for example via the outlet of the safety valve 23.

The downstream end of the bleed-off circuit 5 may then have a fluid connection, for example a quick connection fitted with an automatic shut-off valve, enabling a fluid connection to a bleed-off member 6 fitted with a mating connection.

The body 3 of the tap 1 preferably includes fasteners (for example blind holes 21, see FIG. 7) designed to cooperate with the mating members 12 (for example pins, not shown) formed on the bleed-off member 6. These mating members 12, 21 enable the member 6 to be positioned and/or engaged on the tap 1 (separably).

The tap 1 also includes a bleed-off circuit 7 preferably formed in the body 3 and that comprises a first end 70 designed to be selectively linked to a filling member of the container 2 and a second end 15 designed to be linked to the storage space of the container 2. For example, the second end 15 of the bleed-off circuit 7 coincides with the upstream end 15 of the bleed-off circuit 5, i.e. the filling circuit 7 has a shared portion with the bleed-off circuit 5. As shown, the filling circuit 7 may include a filter 28. The end of the filling circuit 7 defines, for example on the body 3, a filling connection 70 fitted for example with an automatic shut-off valve, for example a quick-connect connection.

As shown schematically in FIGS. 1 and 2, the tap 1 also includes, in the body 3, a circuit 10 for controlling the selective movement of the isolation valve 8 (in addition to the manual control via the control member 18).

The control circuit 10 has a first end linked to the valve 8 and a second end 100 selectively connectable to an electrical and/or pneumatic actuator 11 of a gas bleed-off member 6 mounted on the tap 1.

The control circuit 10 is intended to control, preferably electrically and selectively, the movement of the valve 8 to the position thereof opening (O) or closing (F) the bleed-off circuit 5 (see "O/F", FIG. 2).

For example, the circuit 10 forms a passage in the body 3 of the tap 1 and leads to the outside of the body 3 at an inlet orifice 16 (see FIGS. 1 to 8). This inlet orifice 16 is for example formed to receive, in the body 3 (i.e. in the passage 10), one end of a movable pushrod 17 belonging to an actuator 11 of a gas bleed-off member 6 (see FIGS. 3 to 6).

Preferably, the passage 10 located between the inlet orifice 16 and the isolation valve 8 includes at least one movable force-transmission part 19, 20 to transmit a force from the pushrod 17 penetrating the orifice 16 towards the isolation valve 8, i.e. the movement of the isolation valve 8 towards the open position thereof is caused indirectly via the transmission part 19, 20 actuated by a pushrod 17 (see FIGS. 3 to 6).

More specifically, the body 3 may contain, in the control circuit 10 between the inlet orifice 16 and the valve 8, a movable shaft 20 and a selectively movable stop 19 located between the isolation valve 8 and the movable shaft 20.

The stop 19 forms a slide valve that cooperates selectively (directly or indirectly) with a portion of the manual control member 18, i.e. the position of the stop 19 and the ability thereof to move is controlled by the manual control member 18.

A first end of the movable shaft 20 is thus designed to be pushed by a pushrod 17 controlled by the electrical actuator 11, a second end of the movable shaft 20 being designed to push, by reaction, the movable stop 19 that may or may not act on the valve 8 against the force of the spring 120.

Figure 3:
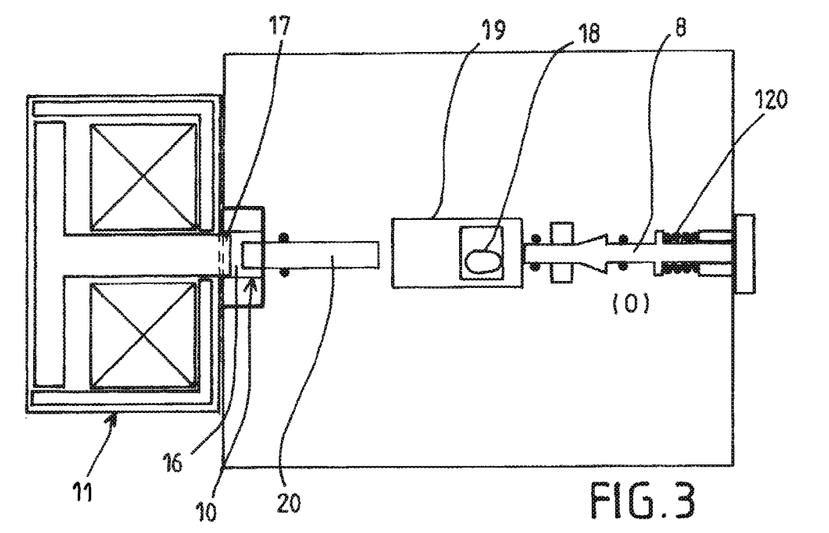
FIGS. 3 to 6 are partial schematic cross sections showing a detail of activation of an isolation valve of the tap in FIG. 1 in four different states respectively.
Figure 4:
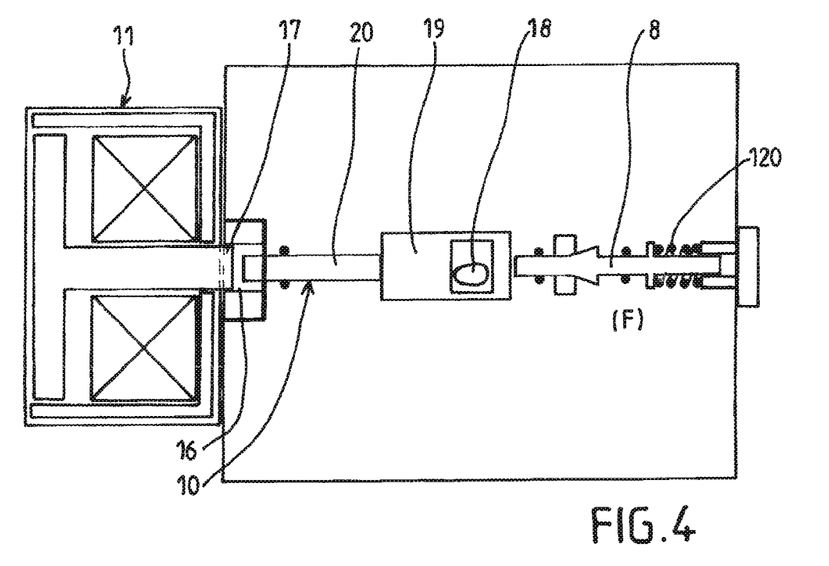

When the control member 18 is in the first position thereof ("O", FIG. 2), the isolation valve 8 is mechanically blocked in the position thereof opening the bleed-off circuit 5, regardless of the state of the control circuit 10 and the state of any electrical actuator 11 connected to the control circuit 10. For example, as shown in FIG. 3, when the control member 18 is in the first position thereof, this member 18 places the movable stop 19 in a fixed and stable position mechanically blocking the isolation valve 8 in the open position (O) against the force of the spring 120. This position of the stop 19 ensures that the pushrod 17 and the shaft 20 are mechanically disconnected from the valve 8.

Conversely, when the control member 18 is in the second position thereof ("F", see FIG. 2), the isolation valve 8 is mechanically blocked in the position thereof closing the bleed-off circuit 5, regardless of the state of the control circuit 10 and the state of any electrical actuator connected to the control circuit 10. For example, when the control member 18 is in the second position thereof ("F", see FIG. 2), this member 18 places the movable stop 19 in a fixed and stable position forming a "screen" preventing the transmission of force between the electrical actuator 11, the pushrod and the shaft 20 on one hand and the isolation valve 8 on the other. Furthermore, in this position the stop 19 ensures the isolation valve 8 is only subject to the force from the return member 120 thereof forcing it towards the closed position thereof ("F", see FIG. 4).

Preferably, the control member 18 can be moved to a third neutral position ("N", see FIG. 2) in which the isolation valve 8 can be moved between the positions thereof opening and closing the bleed-off circuit 5 as a function of the state of the control circuit 10 and any electrical actuator 11 connected to the control circuit 10.

For example, the third neutral position of the control member 18 is located between the first and second positions (see FIG. 2).

Figure 5:
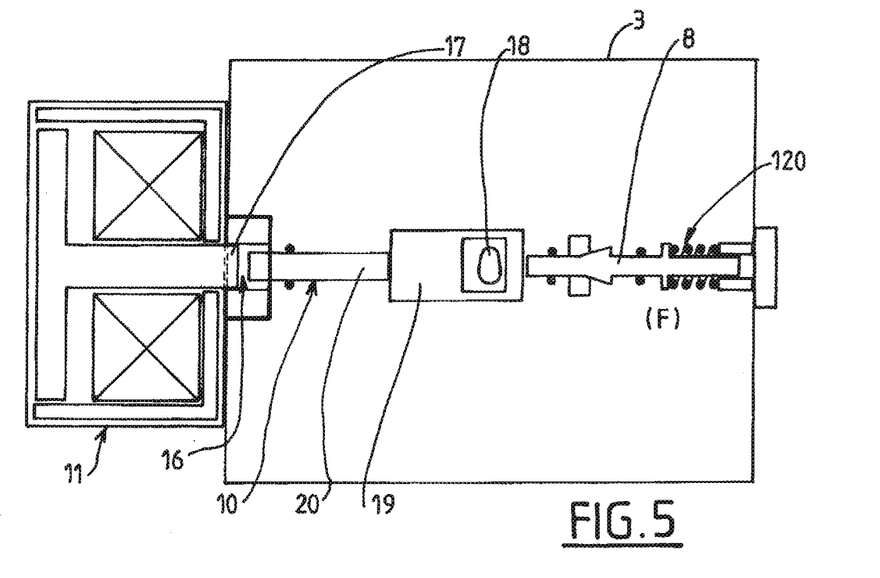

When the control member 18 is in the third position thereof, this control member 18 places a movable stop 19 in a position that can be modified, in particular by means of the pushrod 17 controlled by the actuator 11, i.e. when the control member 18 is in the third position thereof and the actuator 11 is deactivated (zero or low electrical power and pushrod 17 retracted into the actuator 11), the isolation valve 8 is in the closed position thereof under the effect of the spring 120 (see FIG. 5).

Figure 6:
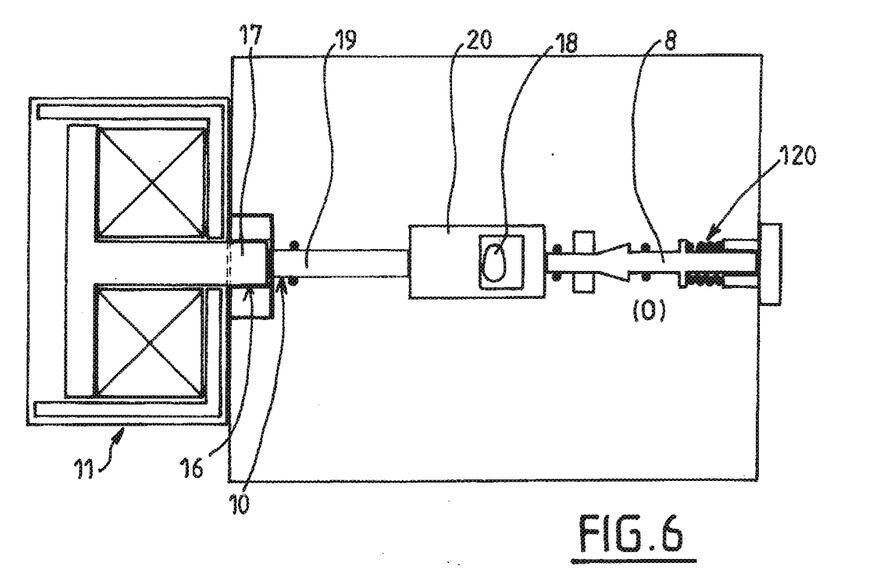

When the control member 18 is in the third position thereof and the actuator 11 is activated (specific electrical power supply, for example at a voltage of 24 V and the pushrod 17 is protruding from the actuator 11), the isolation valve 8 is pushed into the open position thereof (see FIG. 6).

Conversely and preferably, when the control member 18 is in the third position thereof and the isolation valve 8 is placed in the open position thereof by the actuator 11, the movement of the control member 18 into the second position thereof mechanically forces the isolation valve 8 to return to the closed position thereof by applying to said isolation valve 8 a force greater than the force exerted by the actuator 11.

Moreover, when the control member 18 is in the third position thereof and the electrical actuator 11 is deactivated, i.e. the actuator 11 is not controlling the movement of the isolation valve 8 to the open position thereof (the isolation valve 8 is in the closed position thereof), the movement of the control member 18 to the first position thereof mechanically forces the isolation valve 8 to switch to the open position thereof.

It is therefore clear that the tap 1 (and in particular the state of the isolation valve 8) can be controlled manually (via the control member 18) or automatically (via the actuator 11). Preferably and as shown, the actuator 11 is built into a bleed-off member 6 that is separate from the tap 1. Naturally, according to a variant that is not preferred, the passage 100 may house an electrical link only that transmits a command to an electrical actuator (solenoid valve) and/or a pneumatic actuator located on the body 3 of the tap 1.

Conversely, according to the preferred architecture, the actuator 11 (electromagnet, power coil, pneumatic or other) is located only on the bleed-off member 6, which may be part of a fixed application using the gas bled off.

Preferably, the tap 1 is designed to also supply high-pressure gas (without passing through the expansion valve 9). For example, the connection at the end of the filling circuit 7 is fitted with a valve 27 that can be moved to an open position in order to fill the container 2 or perform a bleed-off without passing via the pressure-release member 9, i.e. the filling circuit 7 also enables high-pressure bleed-off (if the isolation valve 8 is in open position).

The tap 1 preferably also includes, for example on the bleed-off circuit 5, a protection system (a calibrated-hole overflow valve, for example) to protect against excessive flow rates in the event for example of a downstream pipe rupturing. Alternatively, in the event of a downstream pipe rupturing, the pressure drops and the relief valve of the expansion valve 9 butts against a part provided with a calibrated orifice of limited diameter on the axis thereof to enable the automatic resetting of the expansion valve once the leak has been stopped.

In manual mode, the user can connect via a quick connector to the outlet (end 25) of the bleed-off circuit. By placing the isolation valve 8 in open position using the control member 18, the user can bleed off the gas at the low-pressure determined by the expansion valve 9 (for example 10 bar).

In automatic or semi-automatic mode, a bleed-off member 6 is connected to the tap 1 (see FIGS. 1 and 9). The bleed-off member 6 is for example located at the end of a hose that carries the gas bled off to an application, for example a fuel cell. A mechanical fastener 12, 21 positions the bleed-off member 6 on the tap 1. The internal gas circuit 14 of the bleed-off member 6 is fluidly connected to the downstream end 25 of the bleed-off circuit 5 of the tap 1. As shown, the internal gas circuit 14 of the bleed-off member 6 may include at least one valve 114 and one safety valve 214 and, where appropriate, a position sensor 30.

In this position, the actuator 11 of the bleed-off member 6 is placed in front of the second end 100 of the control circuit 10 to selectively control the movement of the isolation valve 8 to the open position thereof as a function of whether or not the electrical actuator 11 is energized.

Preferably, a sensor system 30, for example an inductive sensor system, makes it possible to detect the coupling between the bleed-off member 6 and the tap 1 (sensors on the body 3 and/or on the bleed-off member 6). This information can be sent to the gas receiving application (downstream of the bleed-off member 6), wired or wirelessly.

Indeed, the application such as a fuel-cell system may, where appropriate, be connected to several gas sources (hydrogen). A process may be used to determine at any time the identity of the container 2 providing the gas and the quantity of gas in the other containers connected. This function may be performed using an electronic pressure gauge 13, as described previously. This pressure gauge 13 preferably communicates wirelessly with a receiver with short-range signals (1-2 meters, for example) to ensure it does not get mixed up with the emitters of other adjacent containers.

The automatic control of the isolation valve 8 makes it possible to immediately close the valve 8 corresponding to the container indicating a safety problem.

According to a possible variant, the isolation valve 8 is proportionally controlled by the actuator 11 to adjust the output pressure of the gas bled off in place of the release member 9, i.e. a separate release member 9 may be omitted, with the valve 8 performing the isolation and release functions. This makes it possible to more precisely determine the output pressure of the gas, for example using an electrical loop to adjust and control the valve 8. This also makes it possible to change the setpoint pressure of the gas bled off as a function of the requirements of different applications.

It is therefore clear that the tap enables entirely safe manual or automatic operation, either for a gas bottle or for a group of bottles.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A tap for a pressurized gas storage container, comprising
   a body fitted with a gas inlet intended to be connected to the storage space of a container,
   a bleed-off circuit formed in the body and comprising an upstream end intended to be connected fluidly to the storage space of a container and a downstream end intended to be connected fluidly and selectively with a gas bleed-off member,
   a filling circuit formed in the body and comprising a first end intended to be connected selectively to a filling member of the container and a second end intended to be connected to the storage space of the container,
   the bleed-off circuit comprising an isolation valve and a pressure-release member for the gas bled off at a given fixed or adjustable pressure,
   the tap also including a member for manually controlling the movement of the isolation valve, the control member being selectively movable to a first position and to a second position, in which in the first position thereof the control member moves the isolation valve to an open position of the bleed-off circuit, and in the second position thereof the control member moves the isolation valve to a closed position of the bleed-off circuit,
   wherein the tap also includes, in the body, a circuit for controlling the selective movement of the isolation valve to the first position thereof opening the bleed-off circuit, the control circuit having a first end linked to the valve and a second end selectively connectable to an actuator of the gas bleed-off member, to electrically and selectively control the movement of the valve to the position thereof opening the bleed-off circuit.

2. The tap of claim 1, wherein the isolation valve and the pressure-release member for the gas bled off are distinct elements arranged in series in the bleed-off circuit.

3. The tap of claim 1, wherein, when the control member is in the first position thereof, the isolation valve is mechanically blocked in the position thereof opening the bleed-off circuit, regardless of the state of the control circuit and the state of any electrical actuator connected to the control circuit.

4. The tap of claim 1, wherein, when the control member is in the second position thereof, the isolation valve is mechanically blocked in the position thereof closing the bleed-off circuit, regardless of the state of the control circuit and the state of any electrical actuator connected to the control circuit.

5. The tap of claim 1, wherein the control member can be moved to a third neutral position in which the isolation valve can be moved between the positions thereof opening and closing the bleed-off circuit as a function of the state of the control circuit and any electrical actuator connected to the control circuit.

\* \* \* \* \*